United States Patent [19]

Bhatt

[11] Patent Number: 5,610,661
[45] Date of Patent: Mar. 11, 1997

[54] AUTOMATIC IMAGE SCANNING FORMAT CONVERTER WITH SEAMLESS SWITCHING

[75] Inventor: Bhavesh B. Bhatt, Franklin Park, N.J.

[73] Assignee: Thomson multimedia S.A., Courbevoie, France

[21] Appl. No.: 446,092

[22] Filed: May 19, 1995

[51] Int. Cl.$^6$ .................................................. H04N 7/01
[52] U.S. Cl. ................................ 348/446; 348/448; 348/458
[58] Field of Search ...................................... 348/441, 446, 348/448, 449, 458, 556, 558, 469, 604; H04N 7/01

[56] References Cited

U.S. PATENT DOCUMENTS

| | | | |
|---|---|---|---|
| 4,677,482 | 6/1987 | Lewis, Jr. ................................ | 358/140 |
| 4,897,716 | 1/1990 | Drewery et al. ......................... | 358/105 |
| 5,132,793 | 7/1992 | Hirahata et al. ......................... | 348/556 |
| 5,327,240 | 7/1994 | Golston et al. .......................... | 348/607 |
| 5,347,318 | 9/1994 | Kobayashi et al. ...................... | 348/556 |
| 5,386,237 | 1/1995 | Knee ....................................... | 348/458 |
| 5,410,357 | 4/1995 | Rieger et al. ............................ | 348/458 |
| 5,444,491 | 8/1995 | Lim ......................................... | 348/441 |

FOREIGN PATENT DOCUMENTS

| | | | |
|---|---|---|---|
| 639923A2 | 2/1995 | European Pat. Off. ......... | H04N 7/01 |
| 639029A2 | 2/1995 | European Pat. Off. ......... | H04N 5/44 |

OTHER PUBLICATIONS

*Grand Alliance HDTV System Specificationl (draft document) Video Picture Format*, Chapter II, 1994 Proceedings of the National Association of Broadcasters, 48th Annual Broadcast Engineering Conference Proceedings, Mar. 20–24, 1994, pp. 2–5.

Peter Frencken, The Philips Group of Companies, The Netherlands, *Two Integrated Progressive Scan Converters*, IEEE Transactions on Consumer Electronics, Aug. 1986, pp. 237–240.

EPO Search Report.

*Primary Examiner*—Victor K. Kostak
*Attorney, Agent, or Firm*—Joseph S. Tripoli; Eric P. Herrmann; Ronald H. Kurdyla

[57] ABSTRACT

An adaptive scan format converter (14 FIG. 1; FIG. 2) at a transmitter/encoder of a video signal processing system such as a high definition television (HDTV) system, as a function of what format is desired for coding and transmission via an output channel. Similarly, at a receiver, a received scan format is automatically converted (36, FIG. 1; FIG. 2) to a desired format for display as needed. For example, a received interlaced signal (I) will be automatically converted to progressive (P) format to be compatible with a progressive scan display device (39). A received progressive signal will be passed to the display device without format conversion. Automatic scan conversion is performed seamlessly so that, for example, the conversion between progressive main television program material and interlaced commercial material is produced without artifacts and is essentially invisible to a viewer.

9 Claims, 5 Drawing Sheets

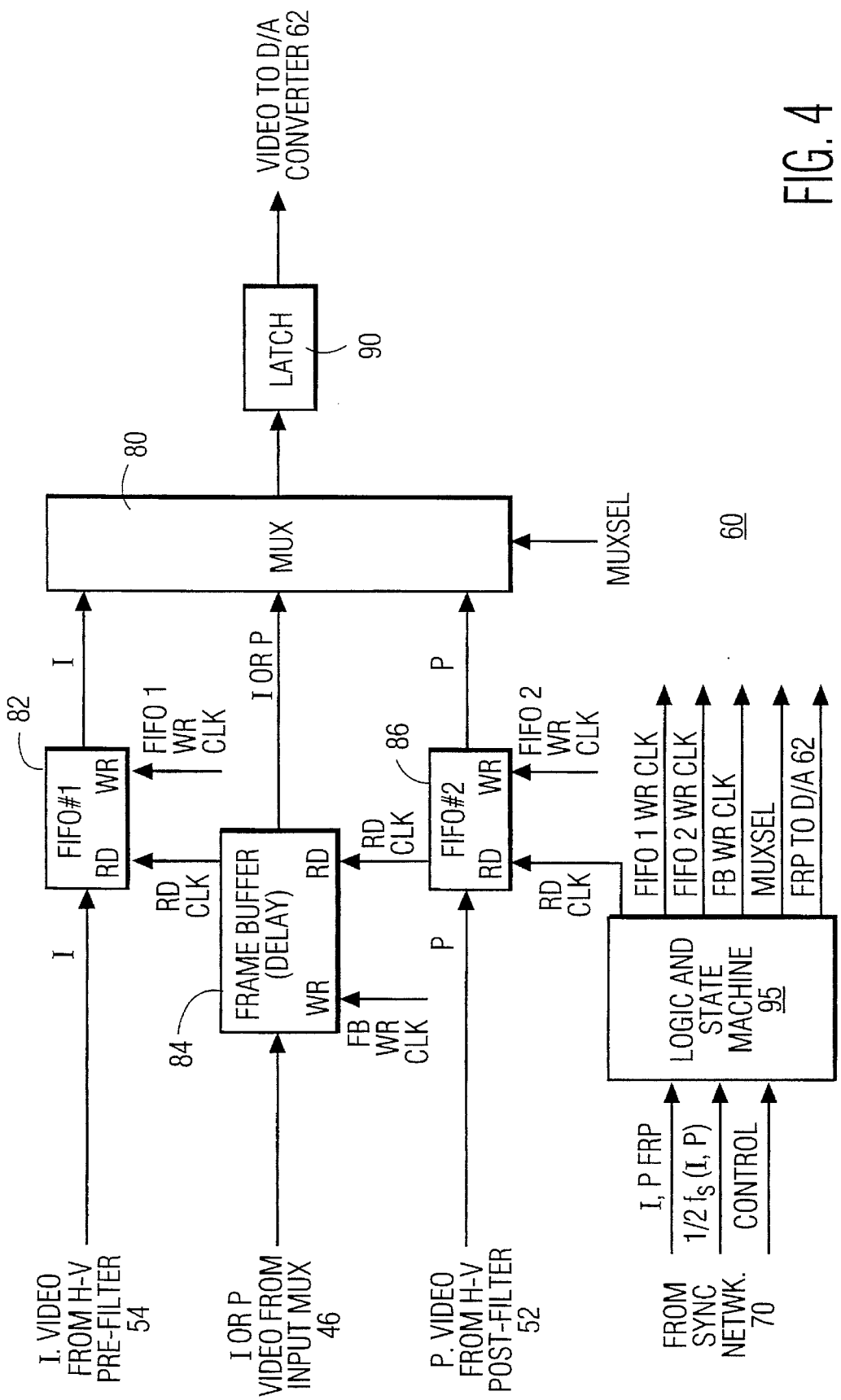

AUTOMATIC IMAGE SCANNING FORMAT CONVERTER WITH SEAMLESS SWITCHING

FIELDS OF THE INVENTION

This invention is related to the field of digital image signal processing. In particular, this invention concerns a line scan converter system suitable for use with a high definition image signal processing such as the high definition television system proposed for use in the United States.

BACKGROUND OF THE INVENTION

Recent developments in the field of video signal processing have produced digital high definition television (HDTV) signal processing and transmission systems. An HDTV terrestrial broadcast system recently proposed as the Grand Alliance HDTV system in the United States employs a vestigial sideband (VSB) transmission format for transmitting a packetized datastream. The Grand Alliance HDTV system is a proposed transmission standard that is under consideration in the United States by the Federal Communications Commission (FCC) through its Advisory Committee of Advanced Television Service (ACATS). A description of the Grand Alliance HDTV system as submitted to the ACATS Technical Subgroup Feb. 22, 1994 (draft document) is found in the 1994 Proceedings of the National Association of Broadcasters, 48th Annual Broadcast Engineering Conference Proceedings, Mar. 20–24, 1994.

The Grand Alliance HDTV system supports image information in two raster line scanning formats. One format is a 2:1 line interlaced format with a 30 Hz frame rate. The other is a 1:1 non-interlaced, or progressive (line sequential) format with a 60 Hz frame rate. The interlaced image display exhibits the following characteristics:

2200 pixels ×1125 image lines (total)

1920 pixels ×1080 image lines (active).

The progressive image display exhibits the following characteristics:

1600 pixels ×787.5 image lines (total)

1280 pixels ×720 image lines (active).

Source material to be transmitted to a television receiver may exhibit either format. For example, a broadcast television program from one source may be in progressive form while one or more commercials or other intervening material from other sources may be in interlaced form.

SUMMARY OF THE INVENTION

In accordance with the principles of the present invention it is herein recognized as desirable to provide an adaptive scan format converter at a transmitter as a function of what format is desired for coding and transmission via an output channel. Similarly, at a receiver, it is recognized as desirable to automatically convert a received scan format to a desired format for display by an associated image display device. In such case, for example, a received interlaced signal will be automatically converted to progressive form if necessary to be compatible with a progressive scan display device, and a received progressive signal will be passed to the display device without format conversion.

In accordance with a feature of the invention, automatic scan conversion is performed seamlessly so that, for example, conversion between progressive main program material and interlaced commercial material, or vice-versa, is produced without artifacts and is essentially invisible to a viewer.

BRIEF DESCRIPTION OF THE DRAWINGS

In the drawings:

FIG. 4 shows a portion of the system of FIG. 2 in greater detail.

DETAILED DESCRIPTION OF THE DRAWINGS

Figure 1:
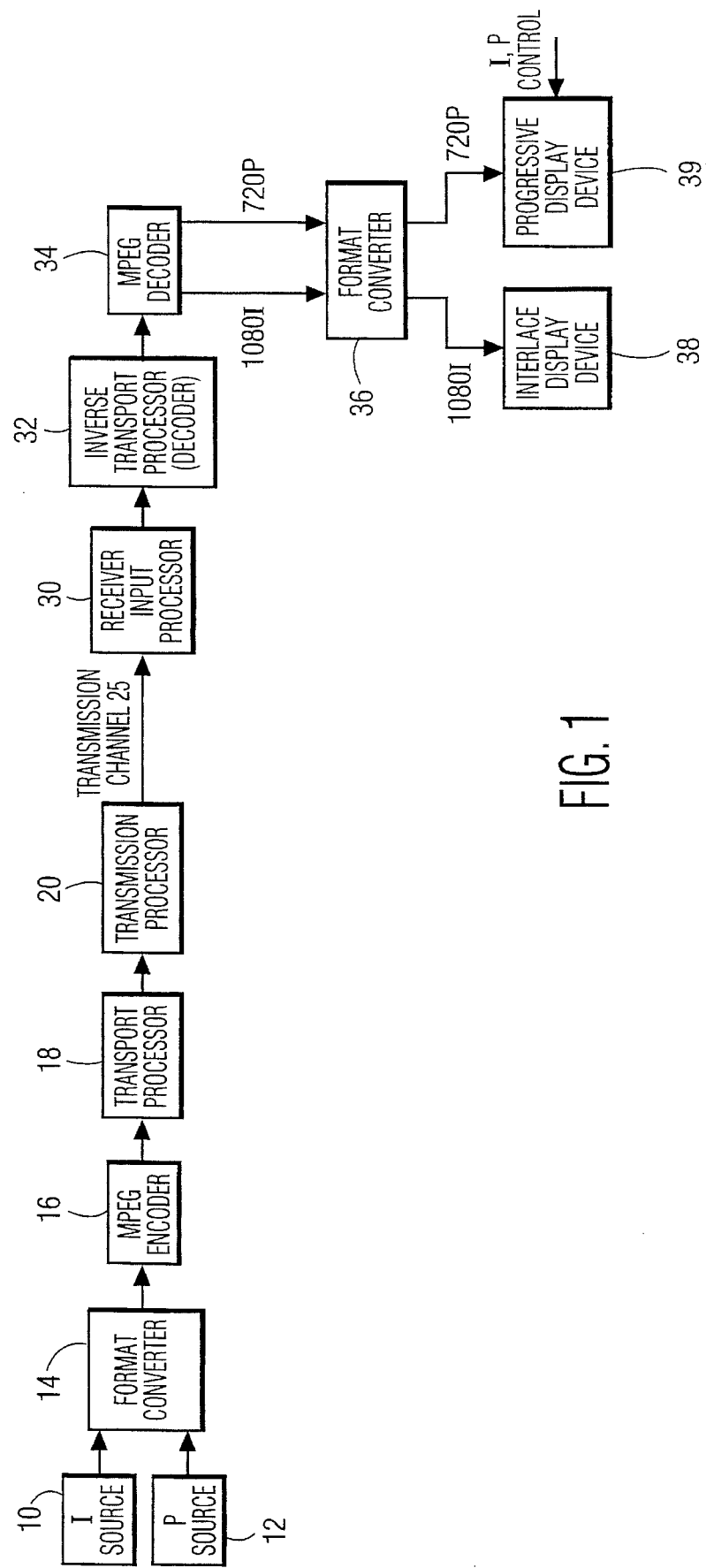
FIG. 1 is a block diagram of a transmitter and receiver television system in which the invention may be employed.

In FIG. 1, a source 10 of interlaced video signal "I" and a source 12 of progressive video signal "P" in a broadcast television encoder/transmitter provide output video signals to respective inputs of an automatic scan format converter 14 which operates in accordance with the principles of the present invention. Scan converter 14 will be shown and described in greater detail with regard to FIG. 2. In this example the television system is an HDTV system of the type proposed by the Grand Alliance in the United States as noted above.

Video sources 10 and 12 are mutually synchronized ("genlocked"). In this example only one of these sources is active at a time, although in some systems both may be active. In the case where only one of the signal sources is active at a time, converter automatically selects the input port with the active video signal. If the scanning format of the active video signal is the same as the format desired for a transmitted video signal, the scanning format of the input video signal is not altered by converter 14. If the input format is different, converter 14 automatically converts the format of the input video signal so as to be compatible with the desired output signal format.

The output signal from scan converter 14 is data compressed by an MPEG encoder 16, as known, before being applied to a transport processor 18. Processor 18 formats compressed data from encoder 16 into data packets, prefaces the data packets with header information which identifies the contents of the respective packets, and adds synchronizing and other information, for example. Data packets from transport processor 18 are processed for transmission via a transmission channel 25 by a transmission processor 20. Processor 20 includes data formatting, error coding, buffering, digital to analog converter and RF (radio frequency) modulating networks for conditioning the video signal for transmission via channel 25.

At a receiver/decoder, the signal from channel 25 is first processed by a unit 30 including RF tuning and filtering networks, IF (intermediate frequency) networks, demodulation and error processing networks, and an analog to digital converter, for example. An output signal from unit 30 is processed by a unit 32 which performs the inverse of the operation of unit 18 at the transmitter. Specifically, unit 32 evaluates header information for identifying the constituent data packet components and separates these components (e.g., video, audio and synchronization information) for processing by respective circuits. The data components from decoder 32 are decompressed by an MPEG decoder 34 as known.

MPEG decoder 34 includes an interlaced video signal output port at which a transmitted 1080 line interlaced video signal would appear, and a progressive video signal output port at which a transmitted 720 line progressive video signal would appear. MPEG decoder 34 also includes provision for deriving coded information from the received data stream indicating whether a received video signal exhibits interlaced or progressive form. A television receiver includes an associated display device which may be an interlaced scan type or a progressive scan type. These possibilities are illustrated by means of an interlaced display device 38 and a progressive display device 39. A practical receiver will have one but not both of such display devices.

The receiver display device receives a signal to be displayed from a format converter 36 (after processing by appropriate signal conditioning and display driver circuits not shown to simplify the drawing). Format converter 36 is programmed with information (e.g., by the receiver manufacturer or via a locally generated control signal) to indicate the type of the associated display, i.e., interlaced or progressive, since in this example it is assumed that an associated display device is able to display video information in only one scanning format. Accordingly, format converter 36 is arranged to automatically provide an output signal in a format compatible with the display device, regardless of which of the two video signal formats is received and decoded. If the display is an interlaced device such as unit 38, converter 36 will bypass a received interlaced video signal from unit 34 to the output of converter 36 without modifying its scan format. If a received video signal is progressive, converter 36 will automatically sense this by sensing that the progressive outport of MPEG decoder 34 is active, convert such signal to interlaced form, and provide such signal at its interlaced signal output. Thus an interlaced video signal will always be provided to an interlaced display regardless of the scanning format of a transmitted video signal. Analogous observations pertain to a receiver with an associated progressive display such as device 39.

Figure 2:
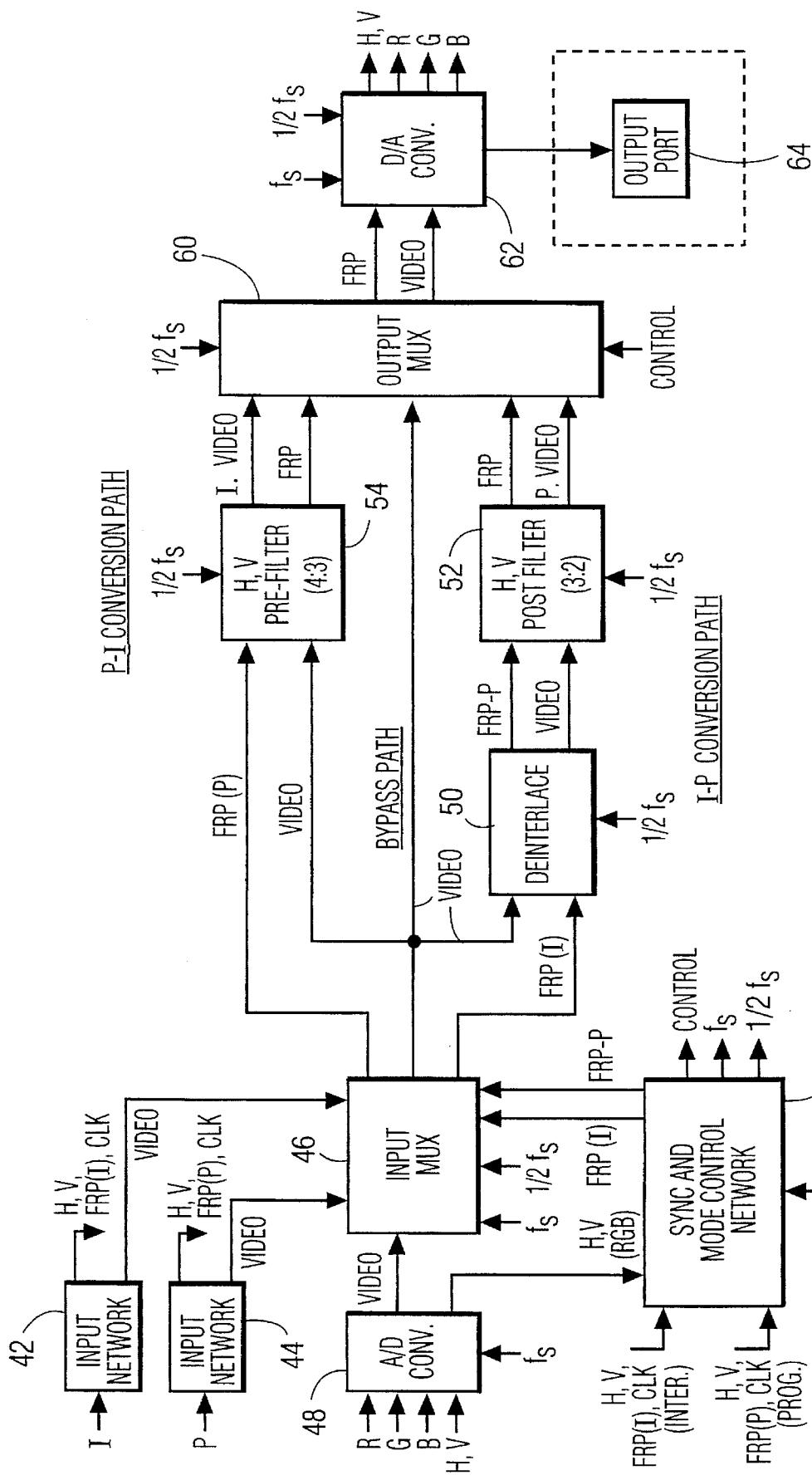
FIG. 2 shows details of a scan format converter system in accordance with the principles of the present invention.

FIG. 2 shows additional details of a scan format converter such as units 14 and 36 in FIG. 1. For purposes of the following discussion it is assumed that the converter of FIG. 2 corresponds to unit 36 in the receiver of FIG. 1. An input network 42 and an input network 44 respectively receive digital interlaced (I) and digital progressive (P) output signals from MPEG decoder 34. The input networks each include circuits for separating the video component and synchronizing components. The sync components include a horizontal sync component (H), a vertical sync component (V), a frame reference pulse (FRP) and a pixel clock CLK. The frequency of the pixel clock is derived from the product of the total number of pixels, the total number of lines, and the number of fields/second. Frame reference pulse FRP is a reference signal developed by MPEG decoder 34. It appears in a prescribed portion of the vertical blanking interval, and provides a reference point from which subsequent circuits count clocks to the first pixel of an interlaced field or a progressive frame.

Converter 36 also includes an analog input for receiving analog R, G, B (or Y, U, V) color video components and associated horizontal and vertical synchronizing components H, V. These components may be generated by a video cassette recorder (VCR) or a video camera for example, and are converted to digital form by an analog to digital converter 48. Video outputs from units 42, 44 and 48 are applied to respective signal inputs of an input multiplexer (MUX) 46.

A synchronization and mode control unit 70 responds to digital sync components H and V, frame reference pulses FRP, and clocks CLK for both interlaced and progressive source signals, as well as to H and V sync components (H, V RGB) for the analog signal source after conversion to digital form by converter 48. A control input of network 70 receives an Output Format Control signal for determining the operating characteristics of the format converter as a function of whether an interlaced or progressive format is desired for an output video signal. This signal may be produced by a local switch setting, and determines whether the output video signal will be interlaced or progressive. This determination may be made by a broadcast operator at a transmitter, or by a receiver manufacturer. Output signals produced by network 70 include a frame reference pulse FRP(I) for interlaced signals, a frame reference pulse FRP(P) for progressive signals, a picture element (pixel) clock $f_s$, a half-rate pixel clock ½ $f_s$, and a Control signal. The Control signal is applied to an output multiplexer 60 for conveying either interlaced or a progressive video signal to an output, as will be discussed. Network 70 may include a phase locked loop (PLL) network frame and field locked by means of the FRP signals.

The pixel clock $f_s$ for an interlaced video signal is a 74.25 MHz signal (2200 pixels 1125 lines total ×30 Hz field rate). The pixel clock $f_s$ for a progressive video signal is a 75.6 MHz signal (1600 pixels ×787.5 lines total ×60 Hz frame rate). These pixel clock frequencies are related by a convenient divider ratio of 55/56 (e.g., 75.6×55/56=74.25), and are therefore readily reproducible. Video information is transferred to the converter system via A/D unit 48 and input MUX 46, and from the converter system via D/A unit 62, at full pixel rate $f_s$. The subsystems within the format converter operate in response to the ½ $f_s$ clock.

Progressive to interlaced format conversion (720 lines to 540 lines) is accomplished by means of a P-I Conversion Path including input MUX 46, a horizontal and vertical pre-filter 54 which performs 4:3 decimation, an output MUX 60 and a digital to analog converter 62. Interlaced to progressive format conversion is accomplished by means of an I-P Conversion Path including MUX 46, a line doubling de-interlacer 50, a horizontal and vertical post-filter network 52 which performs 3:2 decimation, output MUX 60 and converter 62. Techniques for performing interpolation and decimation are well known. In a bypass mode where the scan format of an input signal is not changed at the output, the video signal is conveyed via a Bypass Path including input MUX 46, output MUX 60 and digital to analog converter 62.

At the output, frame Reference Pulses FRP and video information are respectively converted to analog sync components H, V and analog color video components R, G and B by means of converter 62. These components are then conveyed to synchronization and video signal processing and display driver circuits as known. Output port 64 is used only at a transmitter/encoder format encoder, e.g., unit 14 in FIG. 1, to convey digital information to MPEG coder 16. D/A converter 62 includes a Programmable Logic Network (as known) with a counter for generating the output H and V sync components. For this purpose the FRP is applied to a reset input of the counter, and the Programmable Logic Network operates in response to clock $f_s$ and an output format select signal (derived from the Control signal) for producing the H and V output sync components after conversion to analog form.

In the case of interlaced to progressive video conversion via the I-P conversion path, input MUX 46 receives a digital video signal, e.g., from units 42 or 48, at the pixel clock rate. MUX 46 then generates an output signal at one-half the input data rate. Specifically, pixel data arriving in a time sequence A, B, C, D, . . . . are converted to a datastream of two pixels in parallel, e.g., A, B then C, D and so forth. This datastream is provided to an input of deinterlacing unit 50, which also receives a FRP sync component from unit 46. De-interlacing unit 50 operates as known by storing odd field lines 1, 3, 5, . . . and even field lines 2, 4, 6, . . . A video frame is generated by creating additional lines in every field so that an output signal from unit 50 represents a progressive video frame constituted by lines 1, 2, 3, 4, 5, 6, . . . and so forth. This deinterlacing operation could be as simple as repeating lines, or as elaborate as estimating motion in each field for each of the R, G, B color signal components and using the derived motion vectors to adjust coefficients in various directions to produce additional pixels, as known. In the latter case, unit 50 finds the greatest motion vector from among the three RGB color components. This vector is used by interpolation networks to generate new pixel values for the derived line. Thus unit 50 generates an output signal with twice as many lines as the input signal, i.e., 1080 lines derived from the 540 lines in each field.

Horizontal and vertical postfilter 52 subjects the output video signal from unit 50 to 3:2 decimation in the horizontal direction to generate 1280 output pixels from 1920 input pixels. In the vertical direction, filter 52 decimates the output signal from unit 50 by 3:2 to generate 720 output lines from 1080 input lines. This progressive signal is routed via MUX 60 and DAC 62 to subsequent signal processing and display circuits.

In the case of progressive to interlaced conversion via the P-I Conversion Path, an output signal from MUX 46 and the FRP component are applied to a horizontal and vertical pre-filter 54. Filter 54 subjects the video signal to 2:3 interpolation in the horizontal direction to generate 1920 output pixels from 1280 input pixels. In the vertical direction, filter 54 subjects the video signal to 2:3 decimation to generate 1080 output lines from 720 input lines. The interlaced output signal from unit 54 is routed via MUX 60 and DAC 62 to subsequent signal processing and display circuits. In the case of both P-I and I-P path processing, the FRP timing at the outputs of units 52 and 54 remains fixed.

The format converter network continuously outputs video information in the selected format regardless of the input signal format. Output MUX 60 includes a frame memory (delay) network in the Bypass Path to compensate for signal processing delays associated with the P-I conversion path and the I-P conversion path. This frame delay also facilitates the seamless switching between video signals of different format. Switching occurs at frame boundaries. The frame delay allows the input video to switch randomly between the two formats and still provide an output signal in the desired format in a continuous stream without dropping any frames. If the format converter is arranged to provide a progressive scan output, the input signal format can change between progressive and interlaced format without disrupting the signal data flow or losing video information in the output signal of the format converter. This feature allows, for example, a television commercial to be in progressive scan format while television main program material is in interlace scan format. Both types of video information, when merged into a similar scan format using the seamless switching feature of the format converter, can be transmitted and received in real-time as one continuous stream of video information. This feature will be shown and discussed in connection with FIGS. 3 and 4.

Consider the case when the output video signal format is selected to be interlaced and the input video signal initially exhibits a progressive format. Thus initially the format converter operates to convert the incoming progressive format to the desired output interlaced format. Pre-filter 54 in FIG. 2 exhibits a processing delay of slightly more than one frame duration for converting from progressive to interlaced format. The magnitude of this delay is not critical, but should be a known, fixed delay. Assume that while the converted interlaced signal is being transferred to output MUX 60, the format of the input signal changed from progressive to interlaced (which is the desired output format). This change is detected by mode control network 70. This can be accomplished by sensing a mode control signal from preceding circuits such as decoder 34 in FIG. 2, or by detecting activity at the analog signal port (e.g., in the case of format converter 14 in FIG. 2). The Control signal provided by network 70 to output MUX 60 indicates that this format change has occurred, causing output MUX 60 to begin storing the new interlaced input video signal that is conveyed directly from the output of input MUX 46 to output MUX 60 via the Bypass Path. MUX 60 stores this interlaced signal in a frame buffer memory. The frame buffer delay allows output MUX 60 to route the processed progressive video signal from filter 54 in its entirety to output DAC unit 62 for display, followed by the bypassed interlaced video from the frame buffer.

The seamless switching process described above is illustrated by the waveforms of FIG. 3A for the case of providing an interlaced video output signal. Waveform A illustrates the position of Frame Reference Pulse FRP during the vertical blanking interval prior to the active video line scanning interval. The interval between each FRP is one image frame in this example. In waveform (B), Pin-0 and Pin-1 represent input progressive video frames. These frames appear delayed at the output of pre-filter 54 (FIG. 2) as waveform (C) data hvpre-0 and hvpre-1. After conversion to interlaced format, these frames respectively appear as output interlaced video $i_{out\text{-}0}$ and $i_{out\text{-}1}$ shown in waveform (E). In this example, output video information $i_{out\text{-}0}$ corresponds to input frame Pin-0. Output video information $i_{out\text{-}1}$ corresponds to input progressive video Pin-1, and is the last progressive-to-interlace converted frame to appear before the input signal changes to interlaced format. At (1) in FIG. 3A output MUX 60 delays HVPRE filtered data by a few lines as will be explained in connection with FIG. 4. At (2) in FIG. 3A the output MUX delays the video information in the Bypass path by 2 frames, as will also be discussed in connection with FIG. 4.

The input video signal changes to interlaced format at a time $T_0$. These new interlaced frames are labeled $i_{in\text{-}0}$ and $i_{in\text{-}1}$ in waveform D. The interlaced video is subjected to a two frame delay associated with output MUX 60 as noted above, respectively resulting in $i_{out\text{-}2}$ as shown in waveform E. Thus the bypassed interlaced video appears at the output at time T1 and onward. In the interlaced video output shown as waveform (E), interlaced data $i_{out\text{-}2}$, which appears just after a time T1 at a frame boundary, is the first output data from the new interlaced input video signal. From time T1 onward, i.e., from the first line of the next image frame, the video lines continue seamlessly without interruption. In the desired interlaced output signal (waveform E), an interlaced format is produced seamlessly from data $i_{out\text{-}0}$ to data $i_{out\text{-}2}$ etc. as the video input changes from progressive to interlaced format. The switch from a progressive format (waveform B) to interlaced format (waveform D) produces no visible artifacts and is unnoticed by a viewer. The format transition occurs a predetermined fixed amount of time (delay) after the appearance of the FRP to facilitate the seamless transition and avoid a discontinuity in a displayed image.

Figure 3A:
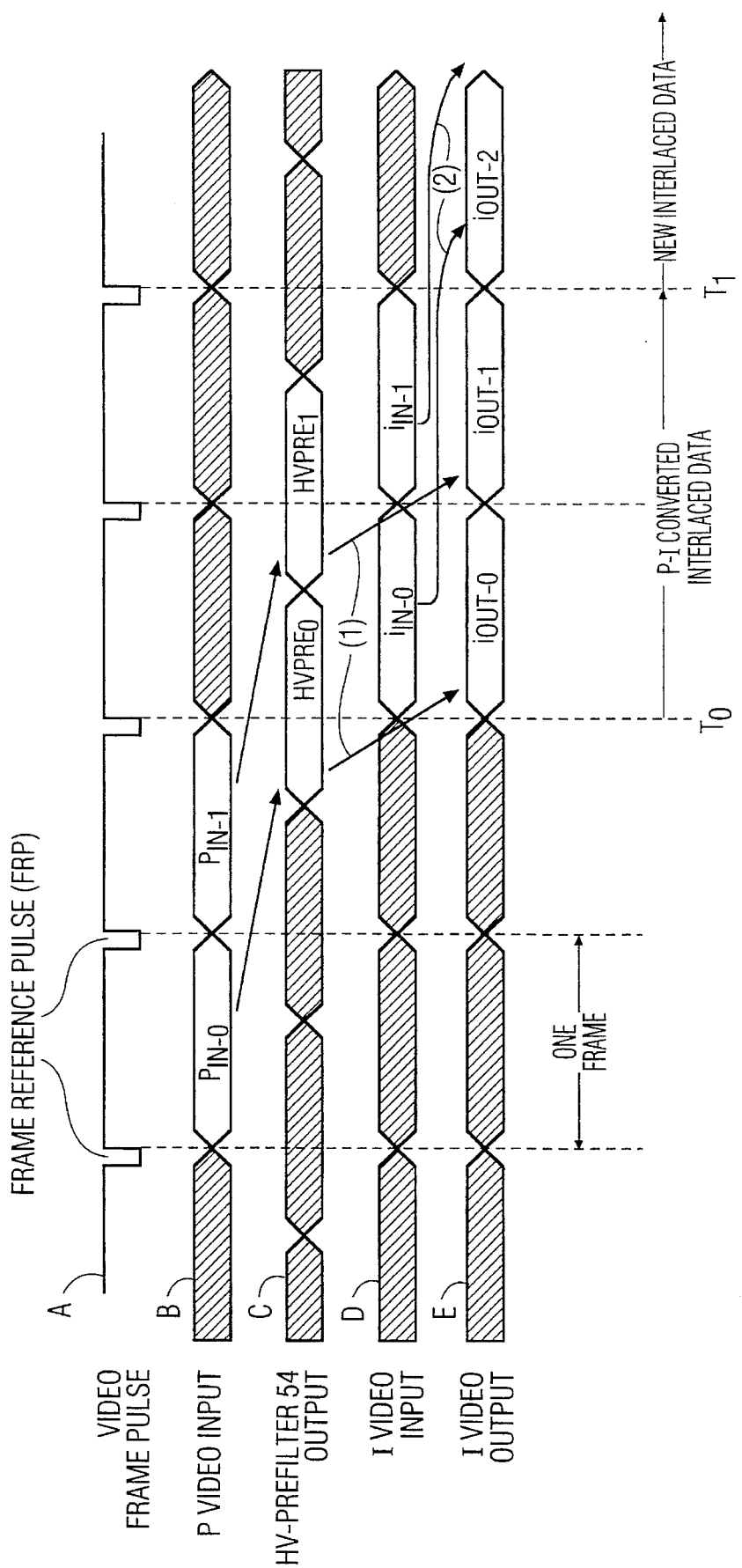
FIGS. 3A and 3B illustrate signal waveforms helpful in understanding the operation of the system shown in FIG. 2.
Figure 3B:
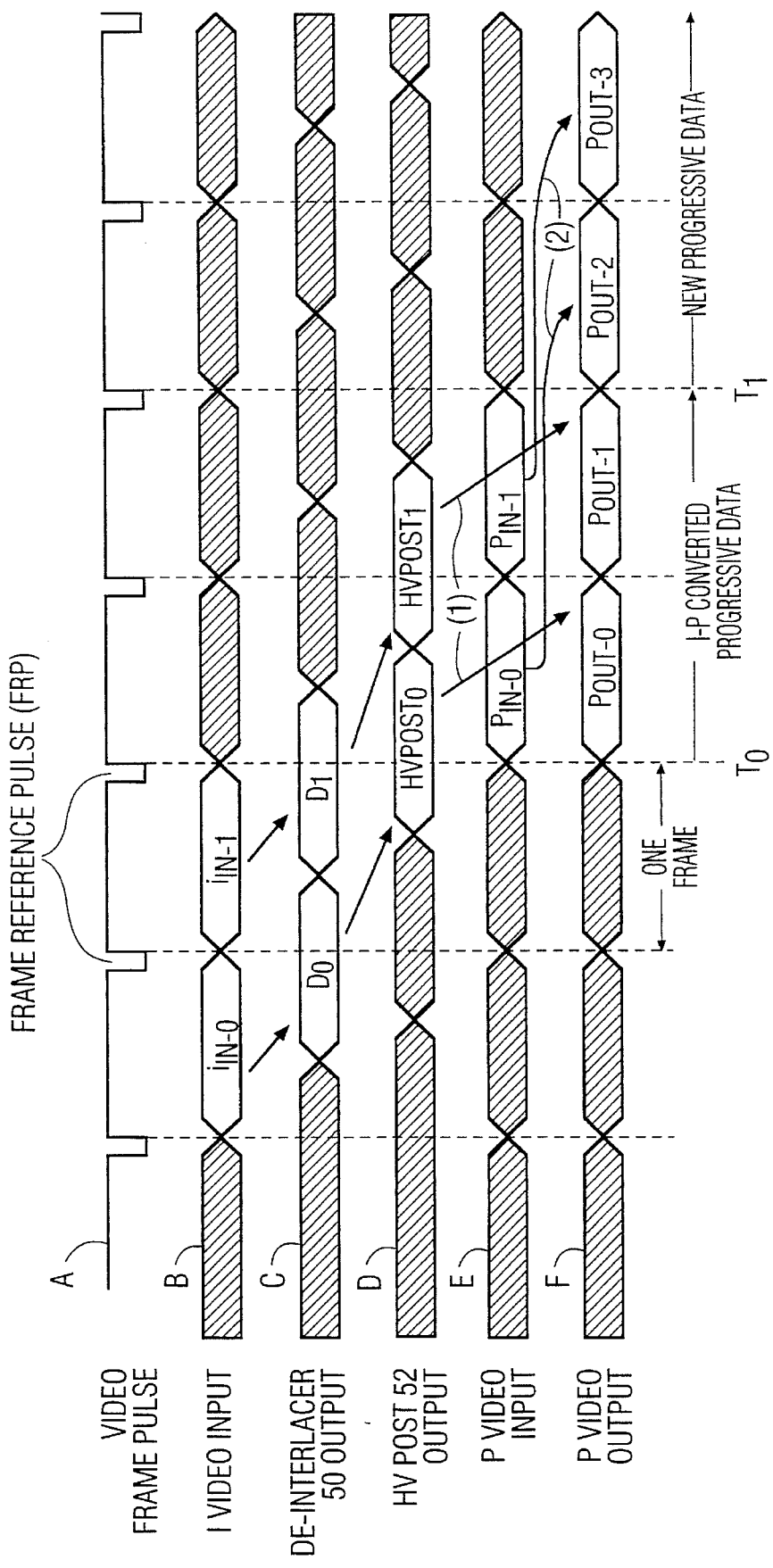

FIG. 3B illustrates the seamless switching process in the case of providing a progressive video output signal format. This is accomplished in a manner analogous to that discussed with respect to FIG. 3A for an interlaced output signal format. In the case of FIG. 3B there are included a waveform C associated with the output of de-interlacer 50 in FIG. 2, and a waveform D associated with the output of HV Post filter 52 in the I-P path in the FIG. 2 system. Waveform D in FIG. 3B is analogous to waveform C in FIG. 3A.

As in the case of FIG. 3A, a delay of a few lines is indicated by (1) in FIG. 3B, and (2) indicates that the progressive video from the Bypass path is delayed by two frames by output MUX 60. Similarly, converted progressive data appears in the interval T0-T1, while new progressive data commences at time T1.

FIG. 4 shows details of output MUX 60. A multiplexer 80 receives an interlaced video input signal from a first FIFO buffer 82, a progressive video input signal from a second FIFO buffer 86, and either an interlaced or a progressive video signal from a frame buffer 84. Interlaced video signals are provided to buffer 82 from prefilter 54 (FIG. 2) in the P-I conversion path, input video signals are directly provided to frame buffer 84 from input MUX 46 (FIG. 2), and progressive video input signals are provided to buffer 86 from post filter 52 (FIG. 2) in the I-P conversion path. The size of buffers 82 and 86 is not critical, e.g., several video lines. Buffers 82 and 86 are used to compensate for the different signal delays associated with the three different input sources.

Frame buffer 84 receives data directly from input MUX 60 in FIG. 2. Buffer 84 exhibits a two frame delay in this example. However, a one frame delay may be used in accordance with the requirements of other systems. Output signals from MUX 80 are conveyed to D/A converter 62 (FIG. 2) via latch 90.

In practice, output MUX 60 in FIG. 2 receives three Frame Reference Pulses (FRP), one from each of filters 52 and 54 and another from input MUX 46. These pulses may be misaligned among each other by a few image lines. The clock-to-data timing may also be misaligned among the three sources. Therefore FIFO buffers are used to "clean up" any delay and timing misalignment before the seamless switching operation associated with MUX 80 in FIG. 4. For this purpose buffers 82 and 84 exhibit a small delay of a few image lines to place processed data near a frame boundary to facilitate seamless switching.

Seamless format switching by MUX 80 is facilitated by the read/write clocking of buffers 82, 84 and 86, and by the referencing of the FRP pulses. For example, when the scan converter is in the progressive-to-interlaced conversion mode, the data write clock for preceding buffer 82 (FIFO 1 WR CLK) is aligned with the ½ $f_s$ clock for filter 54. The write clock for frame buffer 84 (FB WR CLK) is aligned with the ½ $f_s$ clock for input MUX 46. The data read clocks for buffers 82 and 84 are the same (RD CLK). The FRP pulse from the output MUX is referenced from the FRP pulse from the input MUX. Output data from buffer 82 and from frame buffer 84 are referenced to the same clock edge. Analogous observations apply to buffers 84 and 86 when the converter is in the interlaced-to-progressive conversion mode.

A unit 95 including a state machine (e.g., a programmed microprocessor) and a logic network develops the read clock (RD CLK) and write clocks for buffers 82, 86 and 84 (FIFO 1 WR CLK, FIFO 2 WR CLK, and FB WR CLK respectively) in response to interlaced and progressive frame reference pulses I,P FRP, interlaced and progressive pixel clocks I,P ½ $f_s$, and the Control signal from control network 70 in FIG. 2. Unit 95 also outputs a MUXSEL signal which is applied to a control input of MUX 80. In response to this signal, MUX 80 selects as its input either (a) the output from buffer 82 or the output of frame buffer 84, or (b) the output of buffer 86 or the output of frame buffer 84. MUX 80 selects between the two choices in (a) and the two choices in (b) in response to the MUXSEL control signal from state machine 95, which signal is in turn developed in response to the Control signal from network 70 in FIG. 2. These control signals indicate which of conversions P-I or I-P are present, or bypass conditions I-I or P-P where no conversion is to be made. An output FRP from unit 95 is applied to D/A converter 62 in FIG. 2.

In the case of input digital signals, the interlaced and progressive frame reference pulses FRP(I) and FRP(P) are provided from preceding circuits, e.g., decoder 34 of Figure 1 in the case of a receiver, for example. In the case of analog input signals R,G,B and H,V, network 70 of FIG. 1 may for example include a phase locked loop (PLL) responsive to the input analog H sync component for producing related input and output clocks. The output clock may be applied to a counter, a reset input of which receives the V sync component. The counter outputs H and V sync signals as well as FRP(I) and FRP(P) signals at predetermined times suitable for use by the elements of the system of FIG. 2.

Although the invention has been described in the context of a high definition television system, the principles of the invention are applicable to other video signal processing systems such as standard definition television systems.

What is claimed is:

1. In a system for processing a video signal subject to exhibiting either a first image line scanning format (I) or alternatively a different second image line scanning format (P), apparatus including:

an output processor compatible with a predetermined one of said first or second formats;

an automatic scan format converter responsive to said signals exhibiting either said first or second formats for automatically providing an output signal with a predetermined one of said first or second line scanning formats so as to be compatible with the format requirements of said output processor; and a switching network associated with said converter for switching between said first and second formats at image frame boundaries substantially without introducing data discontinuities at said frame boundaries.

2. In a system for processing video signals subject to exhibiting a first image line scanning format (I) or alternatively a different second image line scanning format (P), said system including an automatic scan format converter responsive to said signals exhibiting said first or second formats for automatically providing an output signal with a predetermined line scanning format compatible with the requirements of an output processor, said converter exhibiting seamless conversion between said first and second formats and including:

a controlled output selection network having an input for receiving a signal from a first path (P-I conversion path) for converting a signal exhibiting said first format to a signal exhibiting said second format, an input for receiving a signal from a second path (I-P conversion path) for converting a signal exhibiting said second format to said first format, and an input for receiving a signals with said first or second format from a third path (bypass path) for conveying a signal without format conversion; and a memory device in said third path for conveying signals to said third input of said selection network; wherein said memory device exhibits a delay that is significant relative to an image frame interval.

3. A system according to claim 2, wherein said memory device exhibits at least a one image frame delay.

4. A system according to claim 3, wherein said first and second paths exhibit a signal delay less than the delay of said memory device.

5. A system according to claim 2, wherein said video signal is a television signal;

said first format is an interlaced (I) line scan format; and said second format is a non-interlaced, line sequential progressive (P) scan format.

6. A system according to claim 2, wherein said converter automatically converts the format of an input signal to said predetermined format if said input signal does not exhibit said predetermined format; and said converter passes an input signal without format conversion if said input signal exhibits said predetermined format.

7. A system according to claim 2, wherein said system is a receiver system further including a decoder network coupled between a receiver input and said format converter; and an image display device compatible with said predetermined line scan format.

8. A system according to claim 2, wherein said memory device in said third path (Bypass) exhibits at least a one image frame delay;

said first and second paths each include a storage device exhibiting a delay significantly less than said memory device in said third path;

said frame memory device in said third path and said storage device in said first path are similarly clocked for reading out data in a progressive-to-interlaced scan conversion mode; and said frame memory device in said third path and said storage device in said second path are similarly clocked for reading out data in an interlaced-to-progressive scan conversion mode.

9. A system according to claim 8, wherein said storage devices in said first and second paths exhibit a delay of a few image lines.

* * * * *